United States Patent
Lawhon et al.

[15] 3,693,951
[45] Sept. 26, 1972

[54] PROCESS AND APPARATUS FOR THE TREATMENT OF WELL CUTTINGS

[72] Inventors: Charles P. Lawhon, Houston; Kenneth O. Taylor, Pasadena, both of Tex.; Jerry A. Brock, Commerce, Calif.

[73] Assignee: NL Industries, Inc., New York, N.Y.

[22] Filed: Dec. 30, 1970

[21] Appl. No.: 102,630

[52] U.S. Cl. .......................263/8 R, 110/15, 263/28
[51] Int. Cl. ...............................................F27b 9/24
[58] Field of Search ..............263/8, 28; 34/4; 110/15

[56] References Cited

UNITED STATES PATENTS 3,560,369  2/1971  Rowland et al...............263/28
2,360,257  10/1944  Muller et al. ....................34/4

Primary Examiner—John J. Camby
Attorney—Delmar H. Larsen, Roy F. House and Robert L. Lehman

[57] ABSTRACT

A method and apparatus for the treatment of well cuttings especially adapted for offshore use provides a conveyor belt moving the cuttings through a preheater for partial drying and then to a high-intensity infrared heating chamber in which all volatile material is expelled from the cuttings at a surface temperature higher than the combustion point of petroleum, so that non-polluting, oil-free cuttings are discharged.

8 Claims, 7 Drawing Figures

PATENTED SEP 26 1972

INVENTORS.
CHARLES P. LAWHON
KENNETH O. TAYLOR
JERRY A. BROCK
BY
Dehman H. Janson
AGENT

INVENTORS.
CHARLES P. LAWHON
KENNETH O. TAYLOR
JERRY A. BROCK
BY
AGENT

PROCESS AND APPARATUS FOR THE TREATMENT OF WELL CUTTINGS

This invention relates to the treatment of well cuttings as produced in rotary drilling operations, whereby the cuttings are freed from oil by an infrared combustion process.

In the drilling of wells for oil and gas, a volume of sedimentary formations is removed from the earth to provide the well bore, which is subsequently cased and eventually in favorable cases placed on production. The cuttings are substantially always saturated with water, this being the normal state of buried sediments, and will in many cases contain petroleum hydrocarbons as well. Furthermore, the drilling fluids used in the commonly employed rotary method of drilling are frequently merely aqueous, but very often contain oil as part of the drilling fluid itself, either as a continuous liquid phase as in the case of oil base fluids or the so-called invert emulsion fluids, or they may contain oil as a dispersed phase in the form of an oil-in-water emulsion. When such fluids are used, the cuttings brought to the surface during the course of the drilling of the well will bear a surface coating or entrainment containing more or less oil, which is generally a petroleum oil not essentially different from the crude oil sought by the well drilling operation, although generally representing a refined fraction thereof.

When well drilling operations of the type described are carried out on land, disposal of the cuttings is generally no problem. In remote localities they may be simply left as part of the landscape surrounding the well site, and in more urban areas they may be readily trucked to a suitable dump. In the case of offshore drilling operations, however, cuttings disposal represents a substantial problem. The cuttings may not simply be dumped overboard, except in the infrequent cases wherein they are quite free of any oil inclusion. To do so would be to create an oil slick with its attendant problems. It is necessary in the general case to transport the cuttings back to land and to dispose of them there. Moreover, because of the fact that storage space is at a premium on offshore drilling installations, transporting of the cuttings to land must be carried out periodically, and may not be deferred until the end of the drilling operation.

An object of the present invention is to provide an apparatus and process for the treatment of well cuttings using a compact device which removes substantially all of the oil from the cuttings and combusts the oil completely so that clean cuttings are produced which may be safely discharged into the lake or ocean surrounding the well site, and in which the discharges from the apparatus are all essentially non-polluting to the environment.

Other objects of the invention will appear as the description thereof proceeds.

Generally speaking and in accordance with an illustrative embodiment of our invention, we provide a conveyor belt, which should preferably be made of metal mesh so as to be heat resistant and yet permit drainage therethrough, and which is generally horizontally disposed so as to have an input end and a discharge end. Means are provided to dump the cuttings onto the belt at or near the input end, and the belt is continually vibrated at this point so as to facilitate shaking off any water which may be entrained in the cuttings. The cuttings are then conveyed by the belt through an optional preheating chamber where they are heated by infrared radiation which provides a surface temperature at least as high as the boiling point of water; and they are next conveyed through a high-intensity infrared heating chamber where they are subjected to the action of infrared radiation of sufficient intensity to provide a surface temperature at the cuttings high enough to combust petroleum, also subjected to an air draft. We have found 500° F. to be adequately high. This brings about substantially complete combustion of any oil associated with the cuttings. In this chamber the cuttings are also turned over so that the combustion process may be complete. The cuttings are then conveyed to the discharge end, where they may preferably be sprayed with water so as to reduce their temperature to a safe handling range. The apparatus and process include additional features and details which have not been included in this brief summary, but which will be taken up in the detailed description which follows.

Figure 1:
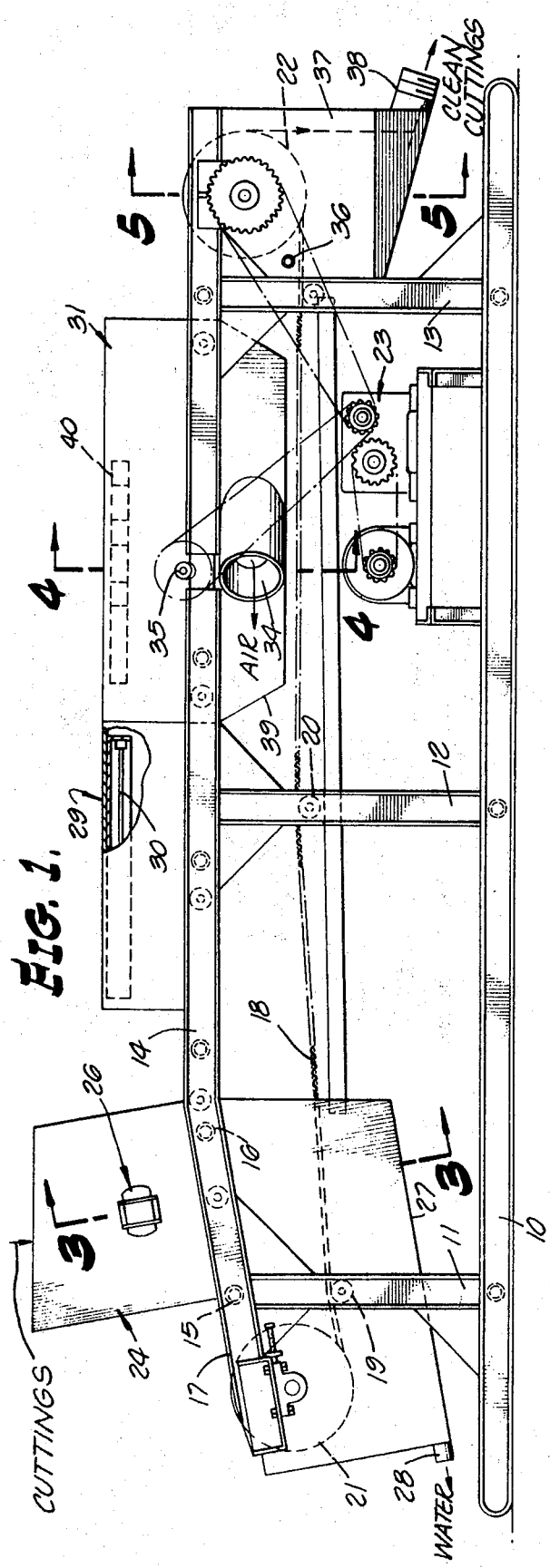
FIG. 1 is a side view of the inventive device, partially cut away, partially in section, and partially schematic.

Turning now to FIG. 1, this shows a base 10 which is provided for convenience in handling, and which may be of the type commonly referred to in the oil field as a skid base. The apparatus proper is conveniently mounted on base 10 by means of substantially vertical uprights 11, 12, and 13. These uprights carry a generally horizontal frame 14 which serves to support, through numerous rollers 15, 16, and the like, the upper portion 17 of the conveyor belt. The lower portion 18 of the same belt is supported as needed by rollers 19, 20, and the like, in the uprights; and the belt itself is maintained in motion by being stretched between two drums 21 and 22, of which the latter is driven by motor means 23, all of which is of conventional type and need not be described in detail. The motion is such that the top portion 17 of the belt moves from left to right as viewed in FIG. 1 and FIG. 2.

Superimposed upon the input portion of the conveyor belt is a cuttings hopper 24, containing some spreader bars 25 insuring an even distribution of the cuttings as they fall down onto the conveyor belt 17. The hopper 24 and the associated portion of the conveyor belt are vibrated by an electrically driven eccentric vibrator 26 of conventional construction. Water shaken out of the cuttings by this vibrating action is collected in trough 27 and eventually discharged through discharge pipe 28. The cuttings then move into a preheating chamber 29, where they are subjected to infrared radiation from heating elements 30 which may be of the type of a steel tube containing an electric resistance element and a heat transmitting, electrically insulating packing such as magnesium oxide. As mentioned, this serves in large measure to drive off the surface water from the cuttings, and to dehydrate their interior. We prefer that these preheating elements 30 be operated at such a rate that a surface temperature of the cuttings beneath them on the conveyor belt reaches at least the boiling point of water.

Figure 6:
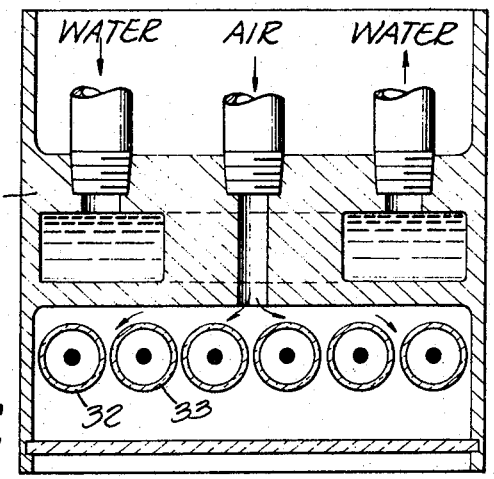
FIG. 6 is a vertical section taken through the apparatus of FIG. 1 as shown by the arrows in FIG. 2.
Figure 4:
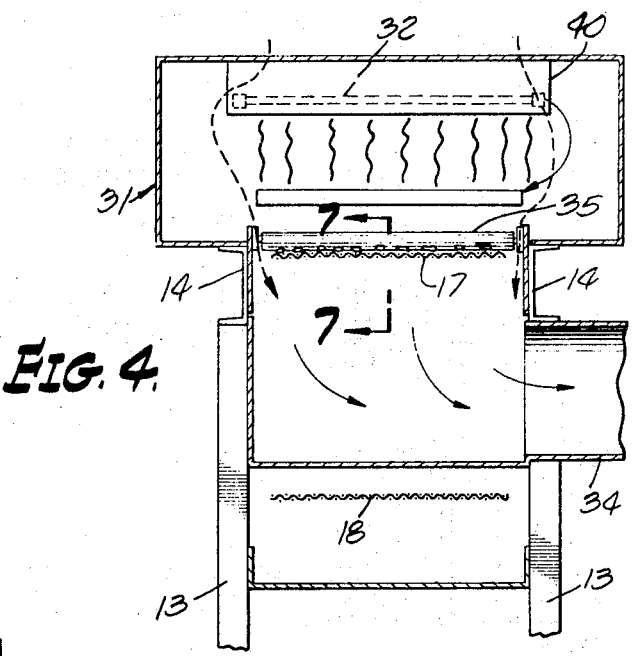
FIG. 4 is a vertical section taken through the apparatus of FIG. 1 as shown by the arrows therein.

From the preheating chamber 29, the cuttings next pass into and through a high intensity heating and combustion chamber 31, in which there are mounted a plurality of high-intensity infrared lamps, most conveniently of the type comprising a heavy-duty straight filament in a heat resistant tubular envelope. That supplied by the General Electric Company having a quartz tubular envelope 18 inches long, operating at 3,200 watts and 384 volts is eminently suitable. In our preferred embodiment, we provide 18 such lamps in three batteries of six each, as may be seen from FIG. 6. The lamps 32, 33, etc. are mounted in a housing 40 which is provided with water cooling for the housing proper, and air cooling for the lamps themselves, as may be seen from FIG. 6. A considerably larger amount of air is supplied to the cuttings traversing chamber 31 by the suction in plenum 39, from which air is removed by exhaust duct 34. As may be seen from FIG. 4, this air traverses the conveyor belt downwardly and passes down through the bed of cuttings on top of the belt, which are simultaneously subjected to intense infrared radiation, so that this combination of air and heat brings about thorough combustion of petroleum hydrocarbons entrained in and on the cuttings. The air with all the products of combustion therein is vented through exhaust duct 34, by blower means not shown.

Figure 7:
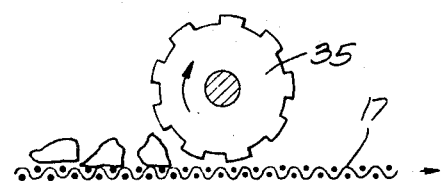
FIG. 7 is a fragmentary cross section taken as shown by the arrows in FIG. 4, showing a detail of the cuttings turner.

Approximately halfway in the middle of the high intensity infrared heating portion of chamber 31 there is mounted directly on top of the conveyor belt 17 a cuttings turner 35, which as may be seen from FIG. 7 is essentially a splined shaft mounted on journals. This turns with the conveyor belt and serves the function of tumbling the cuttings as they pass over the shaft and fall down onto the conveyor belt on the downstream side of shaft 35.

Figure 5:
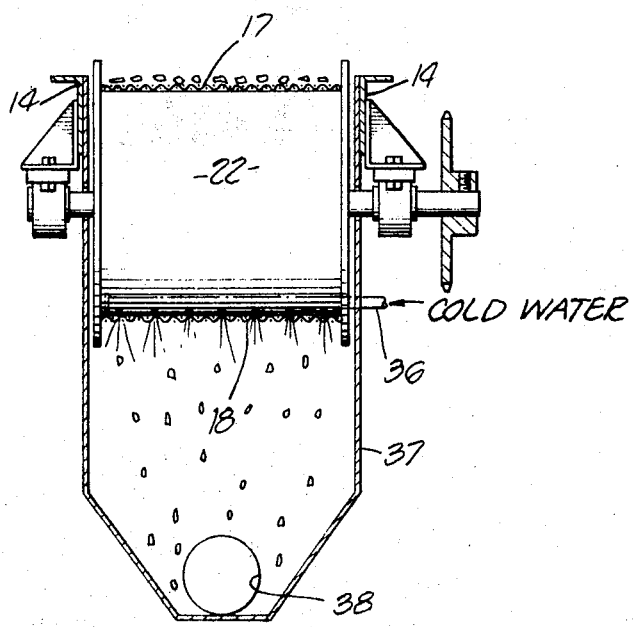
FIG. 5 is a vertical section taken through the discharge end of the device of FIG. 1 as shown by the arrows therein.

The cuttings next pass to the discharge end of the belt, where, as may be seen in detail in FIG. 5, they fall off the belt at its far end and are simultaneously sprayed with coolant water through a sparging tube 36, falling into the cuttings discharge hopper 37 and eventually into the cuttings discharge tube 38.

Figure 2:
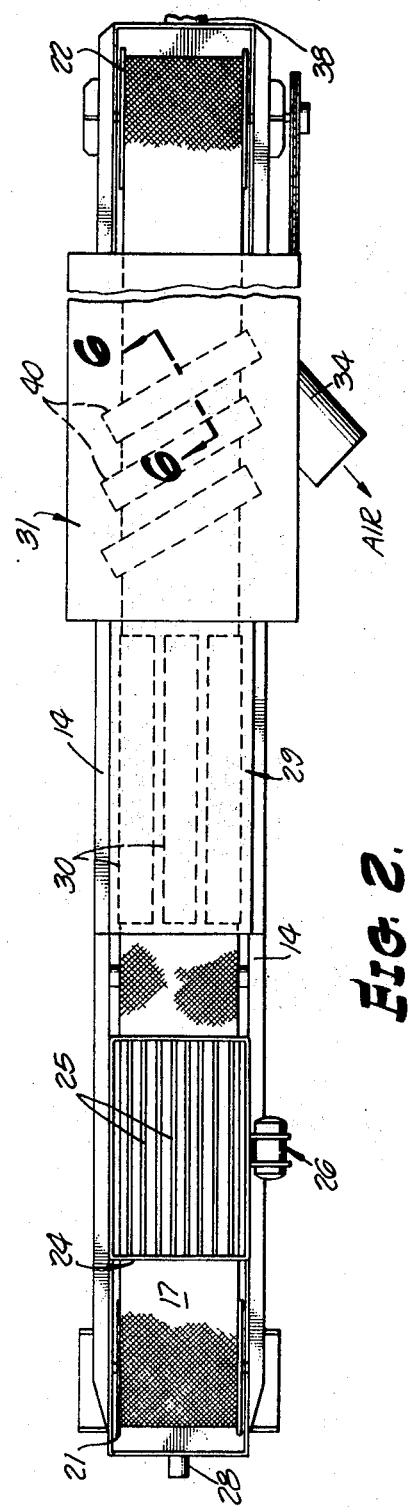
FIG. 2 is a top view of the working portions of the device of FIG. 1.

FIG. 2 is a plan view of the device shown in elevation in FIG. 1, and calls for no detailed discussion. FIG. 2 shows the disposition of the optional preheating elements 30, which are used when the cuttings entrain an unusually large proportion of water, or when the device is to be used at or near maximum throughput.

Figure 3:
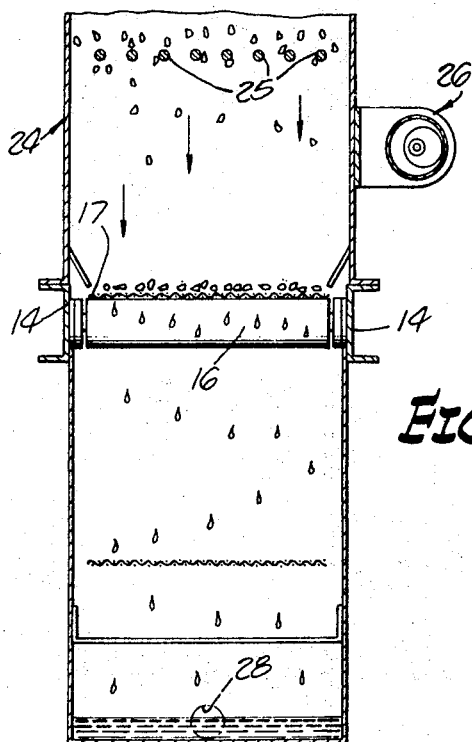
FIG. 3 is a vertical section taken through the device of FIG. 1 as shown by the arrows therein.

FIG. 3, as already mentioned, is a vertical section taken as shown by the arrows in FIG. 1, and illustrates the cuttings input, where they fall onto the moving conveyor belt, and also shows the excess water which is shaken from the cuttings with the aid of the vibrating means 26 and which passes downwardly into trough 27 and eventually is discharged through the water discharge pipe 28.

In the embodiment of our invention which we have described in detail, we have shown as the source of the infrared radiation a battery of lamps powered by electricity. While electricity is generally the most convenient power source on offshore installations, it is to be understood that other sources of high intensity infrared radiation may be substituted for the batteries of electrically powered lamps. For example, there are commercially available catalytic surface combustion heating units powered by natural gas, especially liquefied petroleum gas, in which a large part of the heat of combustion is converted to infrared radiation. Since these are eminently clean-burning devices, they are well adapted to the present invention in situations where the availability of gas as the power source is not a problem.

It may be seen that the invention accomplishes its objects, providing not only for the discharge of clean, substantially oil-free cuttings at the cuttings discharge tube 38, but also, because of the fashion in which air is drawn downwardly over the cuttings while they are simultaneously subjected to the intense infrared irradiation, providing for the discharge of the air with the erstwhile petroleum hydrocarbons fully combusted to carbon dioxide and water vapor. The invention is thus of great value from the standpoint of environmental hygiene.

We wish it to be understood that we do not desire to be limited to the exact details of construction shown and described, for obvious modifications will occur to a person skilled in the art.

Having described the invention, we claim:

1. A process for the treatment of cuttings from rotary well drilling operations which transforms them from a wet, oily condition to a clean, substantially oil-free condition which comprises the steps of emplacing said cuttings on a moving metallic substantially horizontal conveyor belt; freeing excess water from said cuttings while on said belt; conveying said cuttings to a combustion chamber wherein said cuttings are simultaneously subjected to infrared radiation of sufficient intensity to produce a surface temperature sufficiently high to combust any petroleum on and in said cuttings while simultaneously pulling air downwardly through said cuttings while subjected to said infrared radiation; tumbling said cuttings while intermediate of said combustion chamber; discharging said air; and subsequently discharging said cuttings.

2. The process in accordance with claim 1 wherein said temperature is at least 500° F.

3. The process in accordance with claim 1 wherein said freeing of excess water is brought about by vibratory action.

4. The process in accordance with claim 1 wherein said cuttings are subjected to a preheating with infrared irradiation subsequent to said emplacement on said conveyor belt but prior to said cuttings reaching said combustion chamber.

5. Apparatus for the treatment of rotary well drilling cuttings comprising frame means; metallic conveyor belt means generally horizontally disposed and supported by said frame means; motor means for driving said conveyor belt so that the upper loop thereof moves in a substantially horizontal direction; input means for receiving said cuttings and distributing them onto the top of said belt; water-freeing means adjacent said cuttings input means for excess water removal from said cuttings; preheating means adjacent said input means; a combustion chamber surrounding a portion of said conveyor belt and containing infrared radiation means irradiating the top of said belt so as to produce a surface temperature of any cuttings thereon of at least sufficient to combust any petroleum thereon; cuttings turning means intermediate of said combustion chamber; air exhaust means in said chamber serving to pull air downwardly through said belt and said cuttings thereon underneath said infrared lamps; and means for discharging substantially oil-free cuttings from said apparatus.

6. Apparatus in accordance with claim 5 wherein said temperature is at least 500° F.

7. Apparatus in accordance with claim 5 in which said water-freeing means is a vibratory means.

8. Apparatus in accordance with claim 5 having water quenching means for said cuttings after said cuttings have left said combustion chamber.

* * * * *